United States Patent
Lin et al.

(10) Patent No.: US 8,202,009 B2
(45) Date of Patent: Jun. 19, 2012

(54) MPO TYPE OPTICAL FIBER ADAPTER

(75) Inventors: I En Lin, Taipei (TW); Tomoyuki Mamiya, Marlboro, MA (US); Jyh Cherng Yang, Taipei (TW)

(73) Assignees: Protai Photonic Co. Ltd., Sinjhuang (TW); Senko Advanced Components, Inc., Marlboro, MA (US)

( * ) Notice: Subject to any disclaimer, the term of this patent is extended or adjusted under 35 U.S.C. 154(b) by 405 days.

(21) Appl. No.: 12/533,282

(22) Filed: Jul. 31, 2009

(65) Prior Publication Data

US 2009/0290838 A1    Nov. 26, 2009

(30) Foreign Application Priority Data

Jun. 5, 2009  (TW) .............................. 98118659 A

(51) Int. Cl.
*G02B 6/36* (2006.01)

(52) U.S. Cl. ................. 385/55; 385/70; 385/71; 385/72
(58) Field of Classification Search ........................ None
See application file for complete search history.

(56) References Cited

U.S. PATENT DOCUMENTS

| | | | |
|---|---|---|---|
| 5,317,663 A | 5/1994 | Beard et al. | |
| 6,461,055 B1 * | 10/2002 | Zimmel | 385/73 |
| 6,712,523 B2 * | 3/2004 | Zimmel | 385/72 |
| 6,863,446 B2 * | 3/2005 | Ngo | 385/72 |
| 7,972,066 B1 * | 7/2011 | Lin et al. | 385/55 |
| 2005/0111796 A1 * | 5/2005 | Matasek et al. | 385/55 |
| 2009/0060422 A1 | 3/2009 | Lin et al. | |

* cited by examiner

*Primary Examiner* — Mike Stahl

(57) ABSTRACT

An MPO type optical fiber adapter according to the present invention is provided. The main body of the MPO type adapter is unitary thereby avoiding the prior art problem that the stresses cause the two halves of the adapter to separate from each other after time.

13 Claims, 7 Drawing Sheets

MPO TYPE OPTICAL FIBER ADAPTER

CROSS REFERENCE TO RELATED APPLICATION

This application claims the priority benefit of Taiwan Patent Application Serial Number 098118659 filed Jun. 5, 2009, the full disclosure of which is incorporated herein by reference.

BACKGROUND OF THE INVENTION

1. Field of the Invention

The present invention relates to an optical fiber adapter, and more particularly, to an MPO type optical fiber adapter.

2. Description of the Related Art

Fiber optics has revolutionized communication through out the world. With the increased used of fiber optics it has become increasingly important to be able to connect and disconnect fiber optic cables from various sources. Two fiber optic cables can be optically coupled so that they are in communication with each other by using connectors and an adapter, thereby putting each fiber optic cable in communication with the other. The connectors are placed on the end of each cable and then plugged into the adapter. The adapter has two openings each one designed to receive a connector.

However, single-fiber connectors are somewhat bulky for high density application. Therefore, some types of multi-fiber connectors are provided for solving such problems.

Referring to FIG. 1, it illustrates conventional MPO type multi-fiber connectors 110, 110' and the corresponding optical fiber adapter 160 thereof. The connector 110 has guide pins 112 protruding from the front end thereof and the connector 110' has corresponding holes 112' located on the front end thereof. When the connectors 110, 110' couple with each other through the adapter 160, the guide pins 112 will be inserted into the holes 112' and the hooks 162 in the adapter 160 will hook on two recesses 114 of the connector 110 and two recesses 114' of the connector 110', respectively. At this time, the ferrule 118 of the connector 110 will be brought into contact with the ferrule 118' of the connector 110'.

Referring to FIG. 2, the conventional adapter 160 typically consists of two halves 164 of an outer housing. Each half 164 of the outer housing consists of generally of a rectangular cylinder having a flange 166 at one end. Inside each half 164 of the outer housing would be placed half 168 of an inner housing. Once the inner housing is inserted into each half 164 of the outer housing, the two halves 164 of the outer housing are connected by ultrasonically welding the two flanges 166 of the halves 164 of the outer housing.

However, the above design presents serious problems. The cables are naturally flexed in use when the adapter remains fixed. The related stress of this situation can cause the two halves 164 of the outer housing to separate from each other after time. In the prior art, this problem can be solved by constructing the halves 164 of the outer housing from metal which gives the adapter enough strength to withstand these stresses. However, this too presented a problem as metal is much more expensive to purchase and mold than the plastic one.

Accordingly, there exists a need to provide an MPO type optical fiber adapter to solve the aforesaid problems.

SUMMARY OF THE INVENTION

The present invention provides an MPO type optical fiber adapter that the main body thereof is unitary thereby avoiding the prior art problem that the stresses cause the two halves of the adapter to separate from each other after time.

The optical fiber adapter of the present invention includes a main body, two hook members and a hollow middle member. The hook member has a pair of hooks to hook on recesses of the optical fiber connectors. The main body is unitary and has an axial cavity defined by a first side-wall, a second side-wall, a third side-wall and a fourth side-wall. The first side-wall is opposite to the third side-wall and connects with the second and fourth side-walls. The axial cavity has two opposing openings. The first side-wall has an access opening for the hook members and middle member to place within the axial cavity. The middle member will be positioned between the hook members when the hook members and middle member are placed in the axial cavity of the main body.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
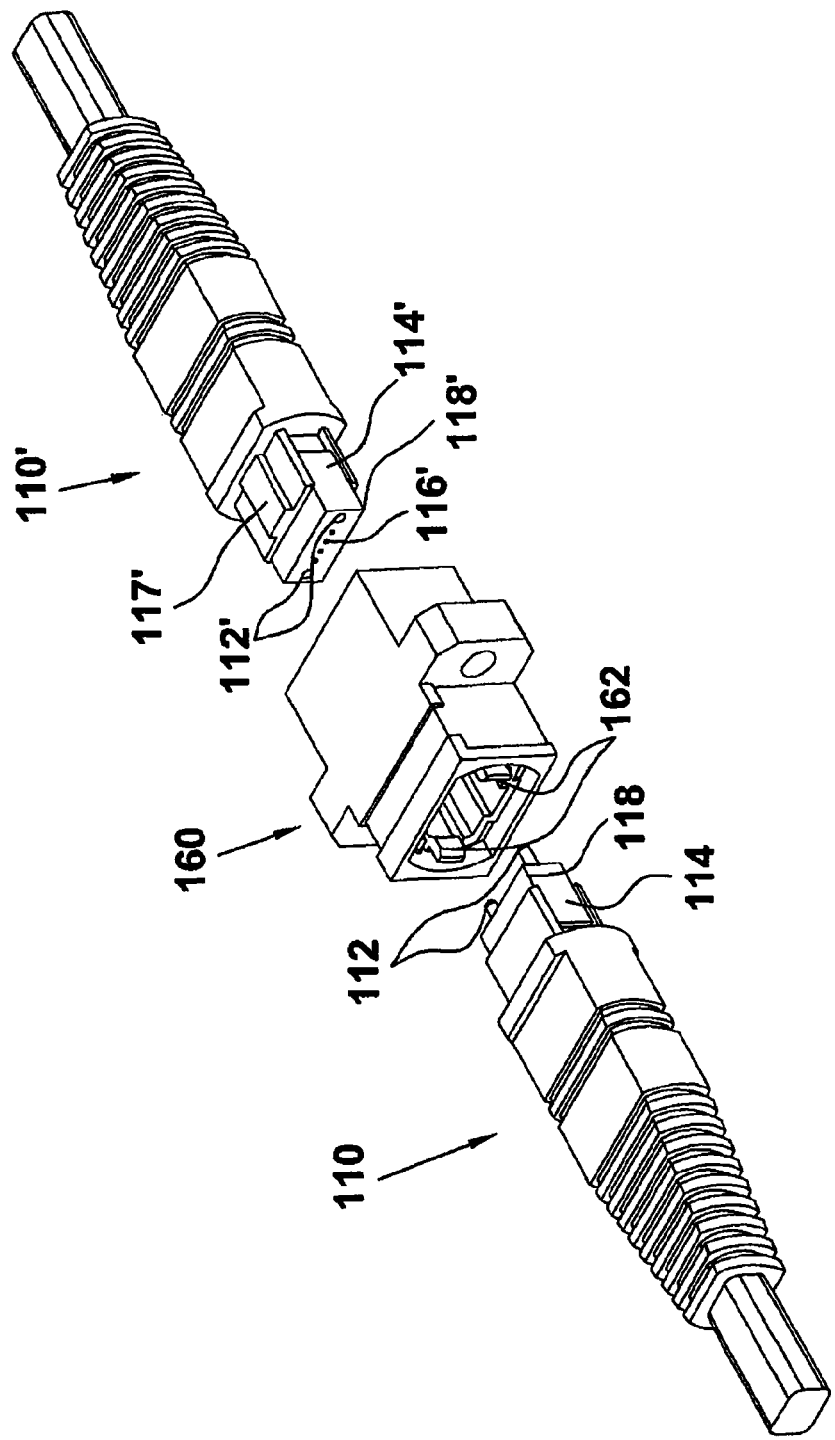
FIG. 1 is an elevated perspective view of a conventional MPO type optical fiber connector and adapter.
Figure 2:
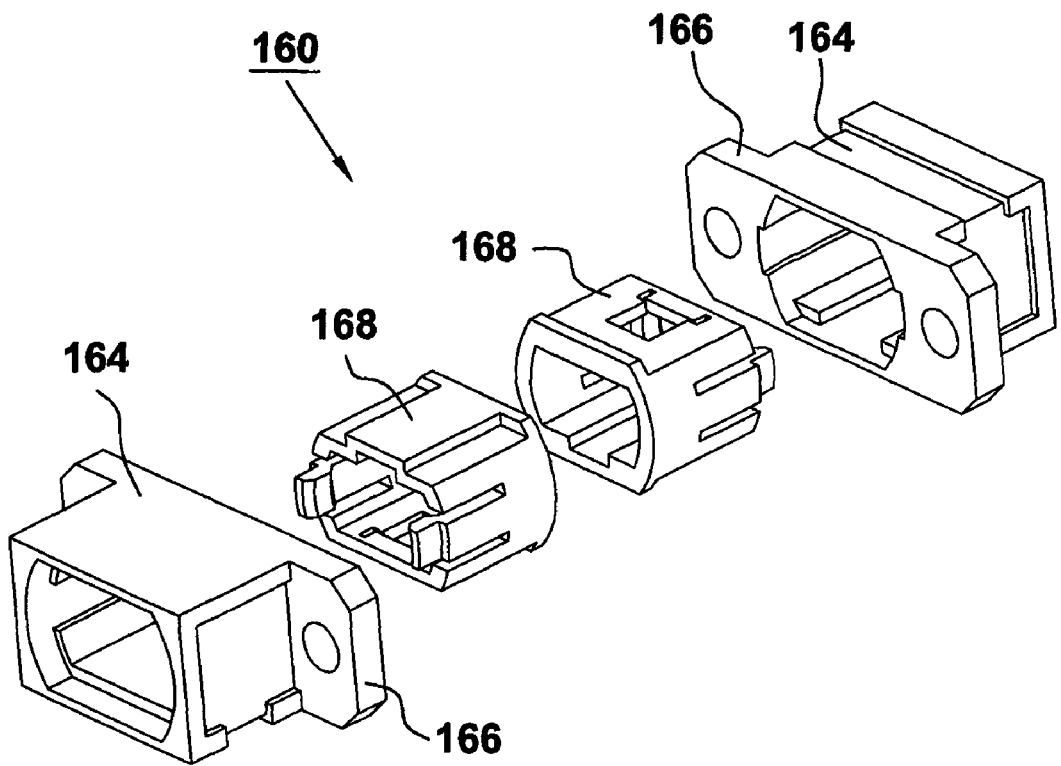
FIG. 2 is an exploded view of a conventional MPO type optical fiber adapter.
Figure 3:
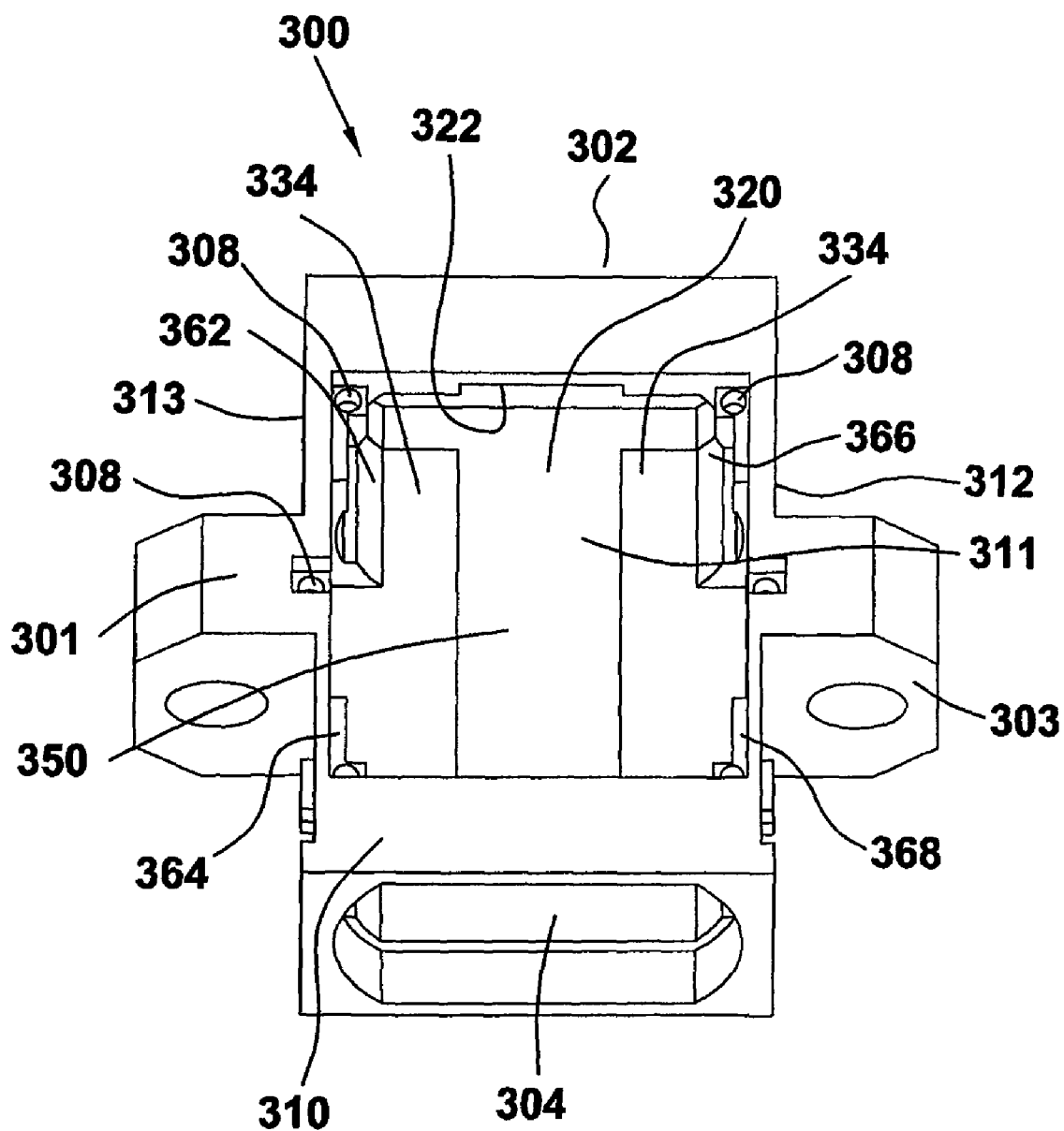
FIG. 3 is an elevated perspective view of the main body of the optical fiber adapter according to the present invention.
Figure 4:
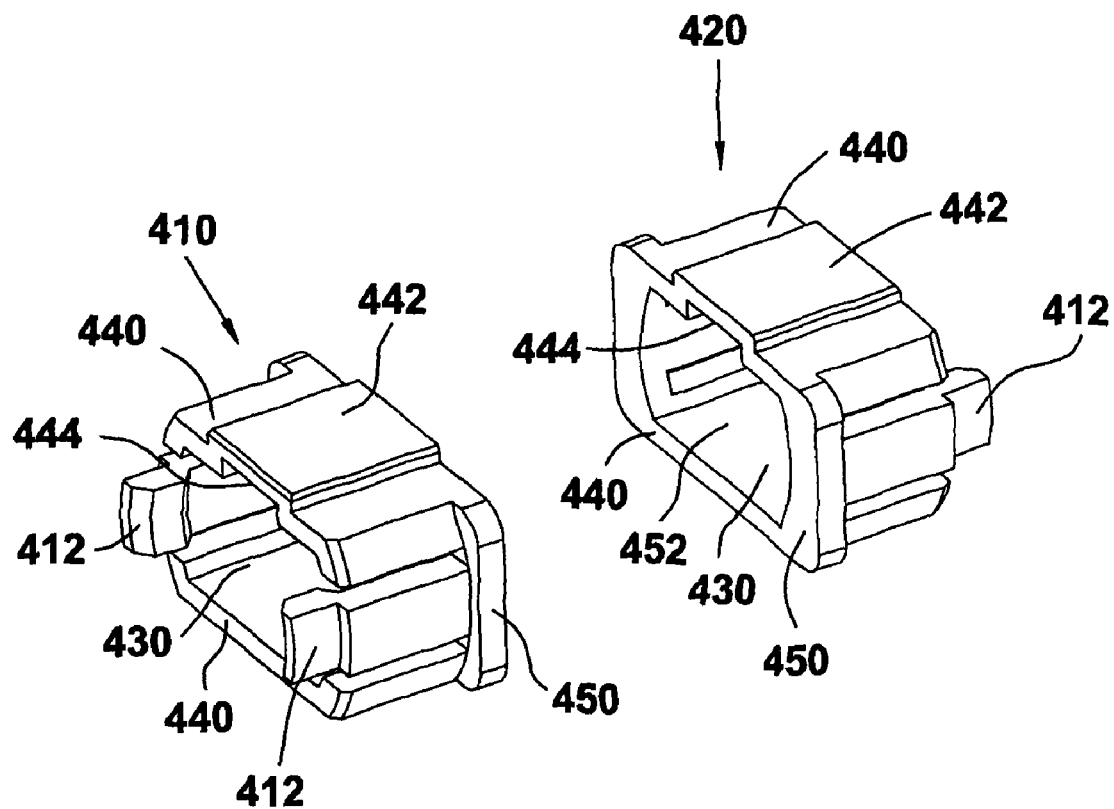
FIG. 4 is an elevated perspective view of the hook members of the optical fiber adapter according to the present invention.
Figure 5:
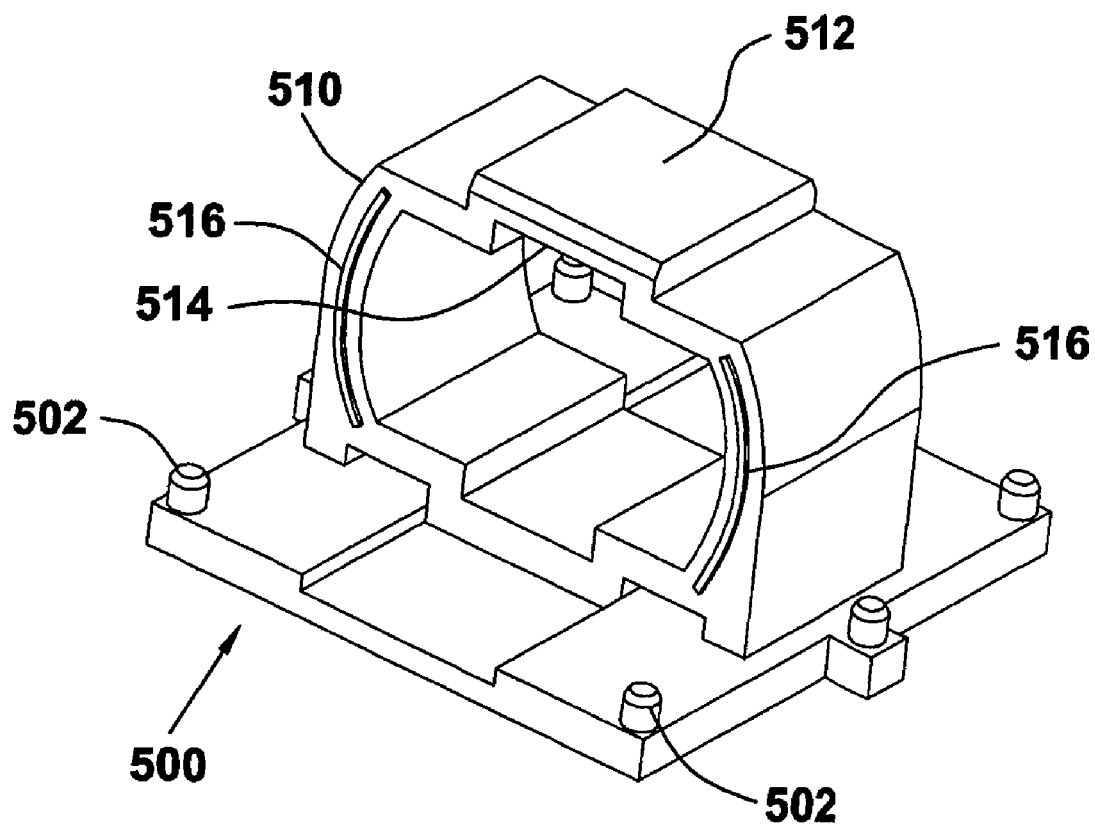
FIG. 5 is an elevated perspective view of the cover and middle member of the optical fiber adapter according to the present invention.
Figure 6:
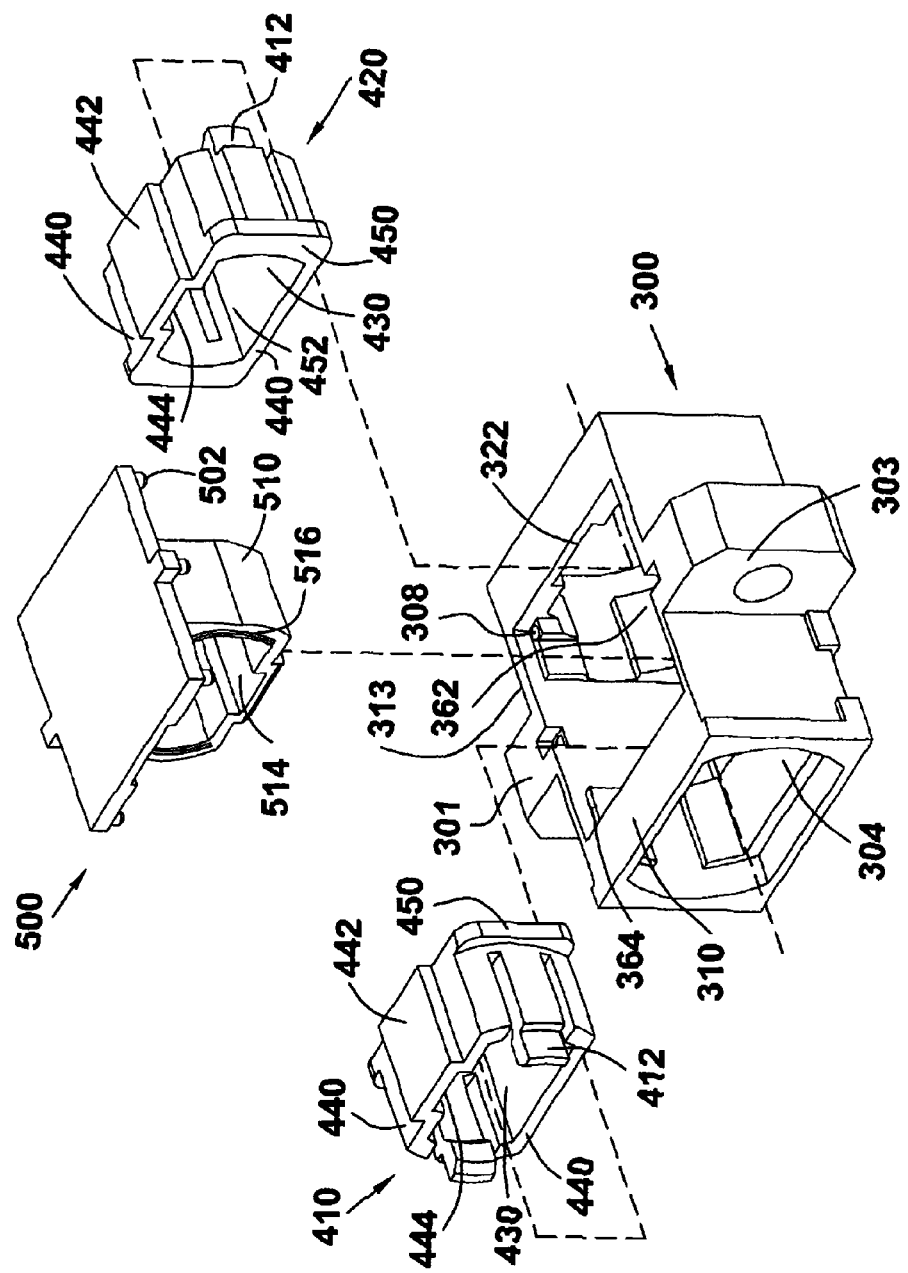
FIG. 6 is an exploded view of the optical fiber adapter of the present invention.
Figure 7A:
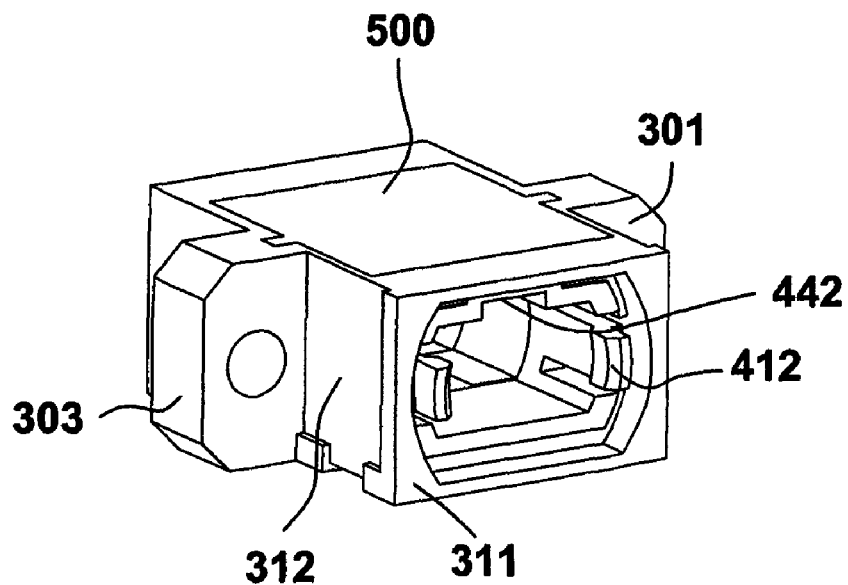
FIG. 7a is an elevated perspective view of the optical fiber adapter of the present invention, wherein the hook members are placed in the main body and the protrusion on one of the hook members is placed in the indentation located on the top side-wall.
Figure 7B:
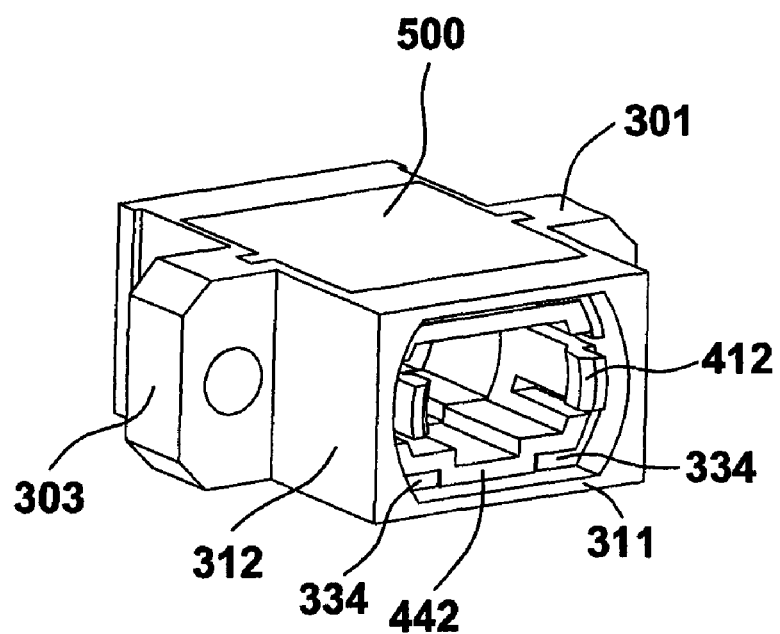
FIG. 7b is an elevated perspective view of the optical fiber adapter of the present invention, wherein the hook members are placed in the main body and the protrusion on one of the hook members is placed in the space between the protrusions located on the bottom side-wall.

Referring to FIGS. 3 to 7b, the optical fiber adapter of the present invention includes a unitary molded main body 300 that has an axial cavity 320 defined by a top side-wall 310, a bottom side-wall 311, a right side-wall 312 and a left side-wall 313, wherein the top side-wall 310 is opposite to the bottom side-wall 311 and connects with the right side-wall 312 and left side-wall 313. The axial cavity 320 has opposing first opening 302 and second opening 304. Located on the exterior of the main body 300 is a pair of tabs 301 and 303. One tab 301 is located on the left side-wall 313 and the other tab 303 is located on the right side-wall 312. The tabs 301 and 303 are operative in supporting the adapter on a surface.

Located near the first opening 302 on the left side-wall 313 and right side-wall 312 are protrusions 362 and 366, respectively. Located near the second opening 304 on the left side-wall 313 and right side-wall 312 are protrusions 364 and 368, respectively. Furthermore, an indentation 322 is located near the first opening 302 on the top side-wall 310 and another indentation (not shown in the figure) is located near the second opening 304 on the top side-wall 310. Two opposing protrusions 334 are located near the first opening 302 on the bottom side-wall 311.

The optical fiber adapter of the present invention further includes two identical hook members 410 and 420 that are constructed by injection molding. Each the member 410, 420 is provided with a pair of hooks 412 extending from one end of a generally rectangular flange 450. Each the flange 450 includes an opening 452 located between the two hooks 412. Moreover, two opposing walls 440 extend from the flange 450 and define with the hooks 412 a generally rectangular accommodation room 430. Located outside the accommodation room 430 on one of the opposing walls 440 is a protrusion 442 with a width of slightly smaller than that of the indentation 322 and the space between the opposing protrusions 334. Located inside the accommodation room 430 on one of the opposing walls 440 is an indentation 444 with a width of greater than that of the protrusion 117' on the connector 110' of FIG. 1.

The optical fiber adapter of the present invention still further includes a cover 500 and a hollow middle member 510 integrally formed on the cover 500. The middle member 510 can be annular. A protrusion 512 is formed on the outer side surface of the middle member 510 and an indentation 514 is formed on the inner side surface thereof.

An access opening 350 is located on the top side-wall 310 of the main body 300. The access opening 350 allows the hook members 410, 420 and middle member 510 to be placed in the axial cavity 320 of the main body 300. In assembling the optical fiber adapter of the present invention, the hook members 410, 420 are first placed in the axial cavity 320 such that the protrusion 442 of the hook member 410 is placed in the indentation located near the second opening 304 on the top side-wall 310 and the protrusion 442 of the hook member 420 is placed in the indentation 322 near the first opening 302 on the top side-wall 310 (see FIG. 7a). Alternatively, the protrusion 442 of the hook member 420 is placed in the space between the protrusions 334 instead of in the indentation 322 (see FIG. 7b). Afterward, the middle member 510 is inserted into the axial cavity 320 and between the flanges 450 of the hook members 410 and 420. The ribs 516 on the middle member 510 will be in tight contact with the flanges 450 of the hook members 410 and 420 when the middle member 510 is in place. The hook members 410 and 420 will therefore be pushed outwardly toward the openings 304 and 302, respectively so that the flanges 450 thereof are against the protrusions 364, 368 and 362, 366, respectively. This way the hook members 410, 420 and middle member 510 can be firmly placed in the axial cavity 320.

Since the middle member 510 is attached to the cover 500, the cover 500 will cover the access opening 350 when the middle member 510 is placed in the axial cavity 320. An ultrasonically welding can be used to attach the cover 500 to the main body 300. In order to more securely cover the access opening 350, the cover 500 is provided with a plurality of protrusions 502 such that these protrusions 502 will be in engagement with the corresponding openings 308 on the main body 300 when the cover 500 is brought to cover the access opening 350.

In operation, the MPO type connectors 110 and 110' of FIG. 1 are respectively inserted into the accommodation rooms 430 of the hook members 410 and 420 from the openings 302 and 304 of the main body 300. When the connectors 110, 110' are fully inserted into the main body 300, the ferrules 118, 118' of the connectors 110, 110' will be brought to pass through the openings 452 on the flanges 450 and arrive at the interior of the middle members 510. The protrusions on the connector 110, 110' will be placed in the indentations 444 of the hook members 410 and 420, respectively and the hooks 412 of the hook members 410, 420 hook on the recesses 114, 114' of the connectors 110, 110' respectively. At this time, the guide pins 112 of the connector 110 are inserted into the holes 112' of the connector 110' and the ferrule 118 of the connector 110 is also brought into contact with the ferrule 118' of the connector 110'.

Since the main body of the MPO type optical fiber adapter is unitary, the prior art problem that the stresses cause the two halves of the adapter to separate from each other after time can be solved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical fiber adapter for optically coupling two optical fiber connectors with each other, each the optical fiber connector having two recesses thereon, the optical fiber adapter comprising:

two hook members each having a pair of hooks adapted to hook on the recesses of the optical fiber connectors and two opposing walls defining with the two hooks an accommodation room;

a hollow middle member; and a unitary main body having an axial cavity defined by a first side-wall, a second side-wall, a third side-wall and a fourth side-wall, the first side-wall being opposite to the third side-wall and connecting with the second and fourth side-walls, the axial cavity having two opposing axial openings, the first side-wall having an access opening for the hook members and middle member to place within the axial cavity, wherein the middle member is positioned between the hook members when the hook members and middle member are placed in the axial cavity of the main body.

2. The optical fiber adapter as claimed in claim 1, wherein each the hook member further comprises a flange for the walls and hooks thereof to extend therefrom, the flange has an opening positioned between the hooks.

3. The optical fiber adapter as claimed in claim 2, wherein each of the second and fourth side-walls is provided with two protrusions, the flanges of the hook members are against the protrusions on the second and fourth side-walls when the hook members and middle member are placed in the axial cavity of the main body.

4. The optical fiber adapter as claimed in claim 2, wherein the middle member comprises a plurality of ribs thereon, the ribs are in contact with the flanges of the hook members when the hook members and middle member are placed in the axial cavity of the main body.

5. The optical fiber adapter as claimed in claim 1, further comprising:

a cover connecting with the middle member, adapted to cover the access opening on the first side-wall.

6. The optical fiber adapter as claimed in claim 5, wherein the cover is provided with a plurality of protrusions adapted to be in engagement with a plurality of openings formed on the main body.

7. The optical fiber adapter as claimed in claim 5, wherein the cover is integrally formed with the middle member.

8. The optical fiber adapter as claimed in claim 1, wherein each the hook member has an indentation formed on one of the walls thereof to receive a protrusion formed on the optical fiber connector.

9. The optical fiber adapter as claimed in claim 1, wherein one of the hook members has a protrusion formed on one of the walls thereof, an indentation is formed near one of the axial openings on the first side-wall to receive the protrusion on the hook member.

10. The optical fiber adapter as claimed in claim 1, wherein one of the hook members has a protrusion formed on one of the walls thereof, two protrusions are formed near one of the axial openings on the third side-wall, the space between the two protrusions on the third side-wall is adapted to receive the protrusion on the hook member.

11. The optical fiber adapter as claimed in claim 1, wherein the optical fiber connectors are MPO type.

12. The optical fiber adapter as claimed in claim 1, wherein the hook members are identical to each other.

13. The optical fiber adapter as claimed in claim 1, wherein the middle member is annular.

* * * * *